(No Model.)

W. E. GIBBS & C. G. OTIS.
MANUFACTURE OF SOAP.

No. 291,329. Patented Jan. 1, 1884.

Attest:
Court A. Cooper
H. E. Hansmann.

W. E. Gibbs
C. G. Otis
Inventors
By Foster & Freeman
Attys.

UNITED STATES PATENT OFFICE.

WILLIAM E. GIBBS, OF ELIZABETH, NEW JERSEY, AND CHARLES G. OTIS, OF BROOKLYN, NEW YORK.

MANUFACTURE OF SOAP.

SPECIFICATION forming part of Letters Patent No. 291,329, dated January 1, 1884.

Application filed May 16, 1883. (No model.)

*To all whom it may concern:*

Be it known that we, WM. E. GIBBS, of Elizabeth, New Jersey, and CHAS. G. OTIS, of Brooklyn, New York, have invented certain Improvements in the Manufacture of Soap, of which the following is a specification.

Our invention consists in certain means, fully described hereinafter, whereby we are enabled to secure a speedy and effective combination of the ingredients used in soap-making, and to secure a superior product at less expense than is required by ordinary processes of manufacture.

Figure 2:
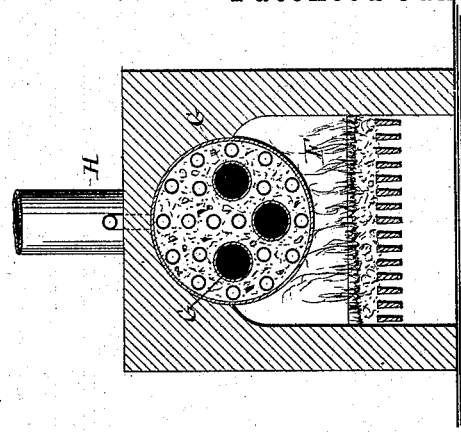
Figure 1:
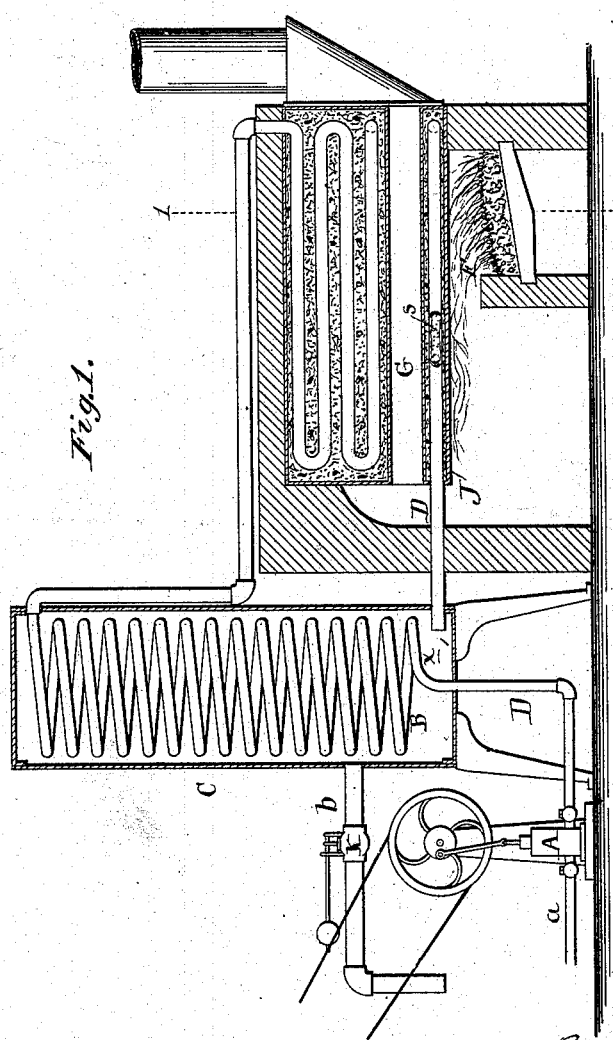

In the drawings, Figure 1 is a sectional elevation of an apparatus devised by us for carrying out our invention. Fig. 2 is a transverse section on the line 1 2, Fig. 1.

The boiler may be constructed in any suitable manner, so as to be heated either by a furnace or otherwise—as by a sand bath or hot pipes—and so as to afford a long heated passage which may be traversed by the materials of which the soap is to be made. In this passage or channel is placed a mass of nails, pebbles, broken coke, or any material which will break up or subdivide the stream of material as it moves along the channel, thereby effecting a thorough mixing and agitation as well as bringing every portion into contact with the heated surfaces. The result is that saponification takes place much more quickly and uniformly, with less loss and less detriment to the material, and results in a better product than is possible by ordinary means.

While apparatus of different constructions may be employed to carry out the above operations, we show in the drawings one which has proved effective.

J is a cylindrical boiler, of metal, supported in the masonry inclosing the fire-place F, and provided with suitable flues G and uptake H. Through this boiler extends a pipe, D, bent to extend back and forth longitudinally through the boiler, and surrounded by water, oil, sand, or other fluid or material and filled with coke *s*, pebbles, or the equivalent thereof.

A is a pump by which the fat and alkali are drawn through the feed-pipe *a* from any suitable receptacle, and forced through the pipe D.

The pipe D, instead of passing directly to the boiler, may be carried in the form of a coil, B, through a cylindrical vessel, C, then through the boiler, and then back to the vessel C, so as to communicate with the space *x*, surrounding the coil, and a pipe, *b*, leading from said vessel, may be provided with a weighted valve, K. This construction causes the hot saponified material to pass into the chamber *x*, and to impart its heat to the coil B, and to the fresh material passing through the latter, which is thus heated, so as to avoid the sudden elevation of temperature which would result from passing the material directly to the heated portion of the pipe, while the saponified material is partly cooled, so that it can be more speedily and readily brought to a solid condition after leaving the apparatus. There is also a saving of fuel resulting from utilizing the heat extracted from the saponified material in cooling it.

Apparatus differently constructed may be employed to secure the contact of the inflowing material with the pipes or conduits through which the outgoing material passes. We therefore do not limit ourselves to the precise construction and arrangement set forth.

We have found that by the means above described we are enabled with a temperature of about 350° Fahrenheit to completely saponify ordinary mixtures of fat and alkali as fast as the material traverses the pipes and passages, the mixture entering at one end of the machine and a constant stream of soap leaving the other. We have also found that the product is superior, and that the materials are better combined.

We do not abandon or dedicate to the public any patentable features set forth herein and not hereinafter claimed, but reserve the right to claim the same either in a reissue of any patent that may be granted upon this application or in other applications for Letters Patent that we may make.

We therefore claim—

1. As an improvement in the art of soap-making, passing the mixture of alkali and fat forcibly through a heated channel filled with small particles of iron or other substance, substantially as set forth.

2. Subjecting the material to the action of heat while passing through a mass of small particles and after being partially heated, substantially as set forth.

3. The combination, in a soap-machine, of a pipe or channel filled with scrap-iron or its equivalent, a heater, and a pump, whereby the material is forced through said channel between the particles of scrap, substantially as set forth.

4. The combination of the tube or channel in which the material is heated, with tubes and casings, substantially as set forth, whereby the hot material passing from said tube is caused to impart its heat to the new supply entering said tube, substantially as specified.

5. The combination of the boiler, tube, vessel C, coil B, heater, and pump, substantially as specified.

In testimony whereof we have signed our names to this specification in the presence of two subscribing witnesses.

WM. E. GIBBS.
CHAS. G. OTIS.

Witnesses:
R. H. BROWN,
CHAS. E. BURROUGHS.